(12) United States Patent
Dueck et al.

(10) Patent No.: US 6,192,057 B1
(45) Date of Patent: Feb. 20, 2001

(54) MECHANISM TO CONTROL TELECOMMUNICATION CONNECTIONS IN A DIGITAL SWITCHING NETWORK

(75) Inventors: Gunter Dueck, Neckargemünd; Karl Fleckenstein, Malsch; Thomas Holey, Waibstadt; Peter Korevaar, Heidelberg; Martin Mähler, Heidelberg; Andreas Rudolph, Heidelberg; Tobias Scheuer, Heidelberg; Heinrich Stuettgen, Bammental; Sven Viergutz, Heidelberg; Hans-Martin Wallmeier, Leimen, all of (DE)

(73) Assignee: International Business Machines Corporation, Armonk, NY (US)

( * ) Notice: Under 35 U.S.C. 154(b), the term of this patent shall be extended for 0 days.

(21) Appl. No.: 08/954,275

(22) Filed: Oct. 21, 1997

(30) Foreign Application Priority Data

Oct. 25, 1996  (EP) ................................................. 96117120

(51) Int. Cl.⁷ ............................... H04J 3/12; H04M 1/64
(52) U.S. Cl. ........................................ 370/524; 379/88.19
(58) Field of Search ..................... 310/410, 522, 310/524; 379/229, 230, 242, 88.19, 88.2, 88.21

(56) References Cited

U.S. PATENT DOCUMENTS

| | | | |
|---|---|---|---|
| 5,036,535 | * 7/1991 | Gechter et al. | 379/210 |
| 5,046,183 | * 9/1991 | Dorst et al. | 370/262 |
| 5,404,400 | * 4/1995 | Hamilton | 379/69 |
| 5,640,449 | * 6/1997 | Worley et al. | 379/201 |
| 5,912,887 | * 6/1999 | Sehgal | 370/354 |
| 5,926,537 | * 7/1999 | Birze | 379/252 |

OTHER PUBLICATIONS

Shankar et al., Internetworking between Acess Protocol and Network Protocol for Interswitch ISDN Services, IEEE CH2766, pp. 10–14, Apr. 1989.*

* cited by examiner

*Primary Examiner*—Huy D. Vu
*Assistant Examiner*—Jasper Kwoh
(74) *Attorney, Agent, or Firm*—Joscelyn G. Cockburn

(57) ABSTRACT

Disclosed is a mechanism to control telecommunication connections via digital switching networks like the ISDN. Frequently observed scenarios are a caller who is connected to an answering machine, although he intended to talk to a human individual, or where a node is shared by more than one individual and the caller wants to talk to a definite person likewise. Subscriber information is interchanged between a calling device and a called device before setting up the connection which is utilized to inform the caller about the device type at the called side or to inform the called side about the desired person. In the ISDN, a called device sends an ALERTING message to a switching center before accepting the connection. The switching center forwards a part of that message to the calling device which includes the so-called USER—USER Information Element (UUIE). In that USER—USER IE, an information like "UNDER THE CALLED NUMBER AN ANSWERING MACHINE IS BECOMING ACTIVE" can be coded. The USER—USER IE is transmitted by the ISDN network transparently to the calling device and thus can be presented to the calling participant via a display device. Alternatively, a different dial tone can be generated by the calling device to inform the participant about the answering machine.

14 Claims, 2 Drawing Sheets

ANSWERING MACHINE LOGIC

SMART TELEPHONE DEVICE LOGIC

LEGEND:

MECHANISM TO CONTROL TELECOMMUNICATION CONNECTIONS IN A DIGITAL SWITCHING NETWORK

BACKGROUND OF THE INVENTION

1. Field of the Invention

The invention pertains to a method and a device for controlling telecommunication connections via digital switching networks, in particular for telephone connections between participants of a telephone network like the integrated-services digital network (ISDN).

2. Prior Art

A frequently observed scenario of telecommunication via switching networks is that a caller is connected to an answering machine, although he intended to talk directly to a human individual. So the caller hangs up and pays for a not desired telephone connection. Currently every time telephone participants talk to an answering machine they have to pay telephone charges and waste time.

Another typical scenario in the field of telephone communication is where a node is shared by more than one individual and that a caller wants to talk to a definite person who currently is not present. Thus, another person will take the call, accordingly causing costs and time.

A first prior art approach for preventing non-desired telephone calls is an automatic telephone answering machine, disclosed in Japanese Patent Publication JP 60-229561, assigned to NEC Corporation and entitled "Automatic Telephone Answering Device". Its purpose is that the answering device automatically calls a called subscriber only when a calling subscriber voices a specific word, but does not answer to a silent telephone call. Proposed is a responding message sender controlled by the output of a voice detector which detects the specific speech of the calling subscriber and sends out a control signal to a speech answering circuit and a calling circuit. Both circuits are activated and the speech answering device sends out an answer message to the calling subscriber and also transmits a tone to let the subscriber know of the incoming call.

A second known approach, a responder absence indicating system for telephone sets, is disclosed in Japanese Patent Publication JP 59-122066, assigned to NEC Corporation and entitled "Display System for Absence of Responsor from Telephone Set". Proposed is to store an absent status by identifying a dial number of a registered absent status. The objective is to allow an originating subscriber to confirm absence of a responsor by storing presence or absence of the responsor regarding every telephone set. It is particularly proposed to discriminate and display a dial number for absence registration from a telephone set. A controller receives a dial number of a telephone set and sends it to a discriminating circuit which discriminated the number to store the absence state in the address of said telephone set. When a second telephone set originates to the first telephone set, a tone is sent out and the absence of the responsor from the first telephone set is confirmed.

There exist further approaches which let a called subscriber know who calls, to identify a caller before answering. In a respective system disclosed in Japanese Patent JP 1243757, assigned to Toshiba KK, the ISDN subaddress information is utilized for that purpose.

A similar approach for identifying a calling terminal is subject matter of European Patent Application 0 680 239, assigned to Nippon Telegraph and Sharp KK. There, a connecting facility connects calls from an identified calling terminal to a private ISDN terminal. A switching system has an identifier unit which identifies the calling terminal of an incoming call by a calling number and a subaddress in a call-setting message. Finally, an approach for improving communication effectiveness and efficiency by excluding unnecessary connections of terminals is disclosed in Japanese Patent JP 7123170, assigned to Nippon Telegraph, where an incoming call from a terminal to another terminal, which are interconnected via ISDN, is notified to a user through a display unit. An address circuit hereby sends a predefined specific code to a substitute address information element at the time of transmission of the call. An address checking circuit checks whether the address is available in the incoming call signal. If the address is not available in the calling signal, a control circuit identifies it as standard communication mode and notifies this to the user through the display unit.

SUMMARY OF THE INVENTION

The known approaches do not solve the problem underlying the present invention, namely to provide a method to avoid being connected to an answering machine when a participant only wants to talk to a human at the other side, or to a definite person, respectively.

The invention solves the above problem by interchanging participant information between the calling device and the called device, before setting up the connection. That information can be utilized to inform the caller about the device type at the called side or to inform the called side about the desired individual which the caller wants to talk with. Hereby, the caller or the called individual, respectively, can decide to accept a connection or not to accept.

A first application scenario is a situation where a human caller wants to get a telephone connection to another human participant, wherein an answering device is provided on the called side, too. A second scenario is a situation where a human caller wants to talk with a definite person and wants to avoid costs for a connection with an undesired person. For instance, he wants to talk with a person which is not present where typically another person receives the call instead of the intended person.

The proposed function is different from known approaches insofar as it does not provide an indication of the calling number to the called participant. In contrast to those approaches, according to the concept of the invention, the calling participant provided specific information about the desired called participant. It is further emphasized that the present invention is applicable to common telephone calls, telephone and video conferences, including device—device connections, human—human connections, and mixed connections between devices and human participants.

By use of, for instance, a different alerting tone or a display message, a caller can be informed that e.g. an answering machine is active at the called participant's side. This information can be provided by the answering machine and transmitted via the known ISDN ALERT message. The ISDN ALERT message is part of the actual ISDN protocol definition.

Thus, the proposed method saves caller's time and money and thereupon increases network performance by reducing the amount of unintended connections and keeping the network free for other intended connections.

An information that an answering machine is active under a called telephone number is not known in current switching networks. For that reason, the called device, e.g. the answering machine itself, has to notify its device type to the calling device, e.g. a telephone. Exchange of such information before setup of an operable connection is already supported in digital switching networks like ISDN, in contrast to analog switching networks. For instance, in ISDN a called device sends an ALERTING message to a switching center, before accepting the connection. The switching center forwards a part of that message to the calling device which includes the so-called USER—USER Information Element (UUIE). The USER—USER information element is a block of information comprising information about the users. It may be included in known ISDN messages, like in the ISDN SETUP message or the ISDN ALERT message. In said UUIE, an information like "UNDER THE CALLED NUMBER AN ANSWERING MACHINE IS BECOMING ACTIVE" can be coded. In an analogous manner, other information about end devices can be coded, like about Telefax or Personal Computers.

The UUIE is transmitted by the ISDN network transparently to the calling device and thus can be presented to the calling participant (person) via a display device. Alternatively, a different dial tone can be generated by the calling device to inform the participant about the answering machine. Hereby, the calling participant can be informed about the called device before setting-up (accepting) an active connection (CONNECT), without need of any changes in the switching units of the ISDN network.

Therefore, a particular advantage of the proposed solution is that the existing ISDN switching service must not be amended for an implementation of the invention.

In cases of multi-subscriber telephone numbers, a preferred embodiment is a smart telephone device which interprets the called party number or the calling party number. The corresponding Information Elements (IEs) are also provided in the SETUP CONNECTION message. This IEs can be used for example, to ring a bell in different tones depending on the called or calling individual.

BRIEF DESCRIPTION OF DRAWINGS

In the following, a preferred embodiment of the invention is described in more detail with reference to the accompanying drawings; where

FIG. 1 depicts a situation where a caller is calling a number via an ISDN digital switching network, wherein at the called side an answering machine is currently active. It is particularly assumed that the caller does not intend to talk to the answering machine, but only to the respective subscriber (individual) registered for that telephone number.

At first, a connection setup is initialized by the caller wherein a setup message is transmitted to the called side via the ISDN network. The end-device at the called side returns an ALERTING message before accepting a connection. The ISDN network then forwards a part of that message to the calling device which includes a so-called USER-to-USER Information Element (UUIE). In that UUIE, an information like "UNDER THE CALLED NUMBER AN ANSWERING MACHINE IS BECOMING ACTIVE" can be coded by setting a predefined value. Since there is no such value defined yet, it has to be agreed on by end enjoyment supplier committees.

The UUIE transmitted over the ISDN network is received at the calling device and thus can be presented to the calling subscriber (person) via, for example, a display device. Alternatively, a different dial tone can be generated by the calling device to inform the participant about the answering machine currently being active.

Figure 1:
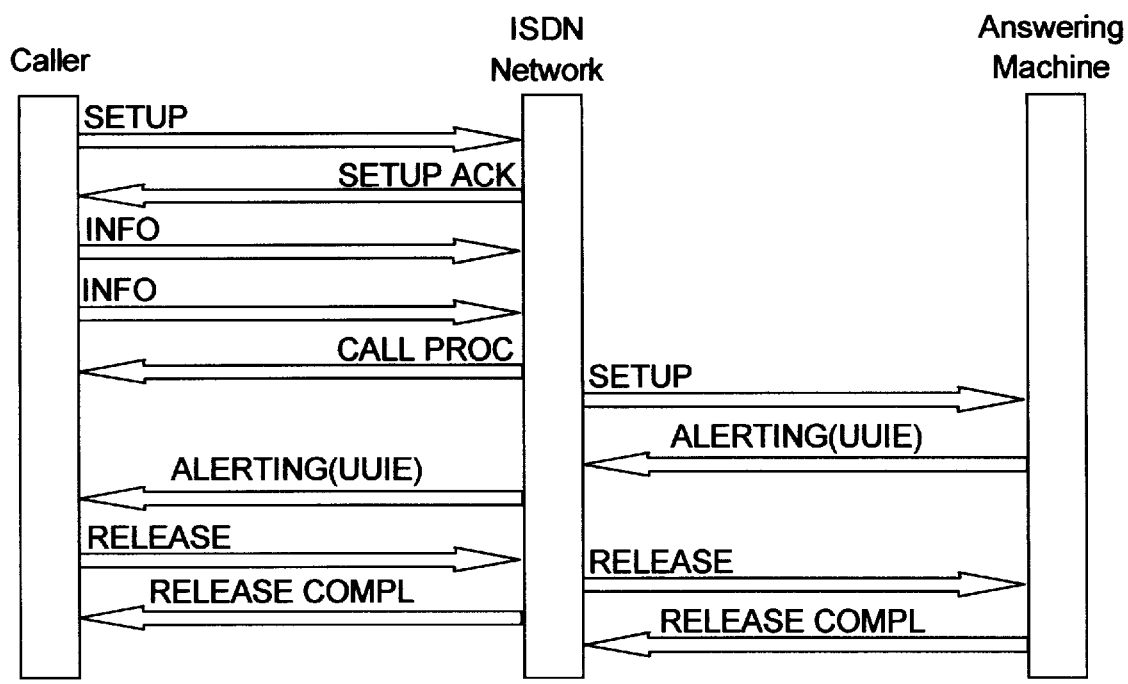
FIG. 1 is a flowchart illustrating an ISDN communication protocol for setting up a telephone connection according to an embodiment of the invention which comprises participant information delivered by an answering machine.
Figure 4:
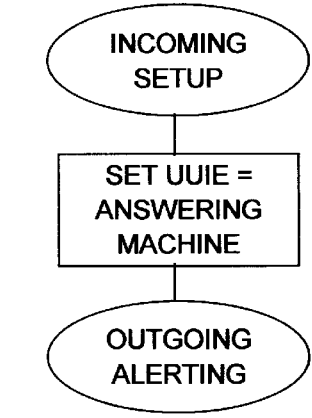
FIG. 4 shows the additional logic required in an answering machine at the called side (left half), and the additional logic required in a smart telephone device at the calling side (right half).
Figure 4:
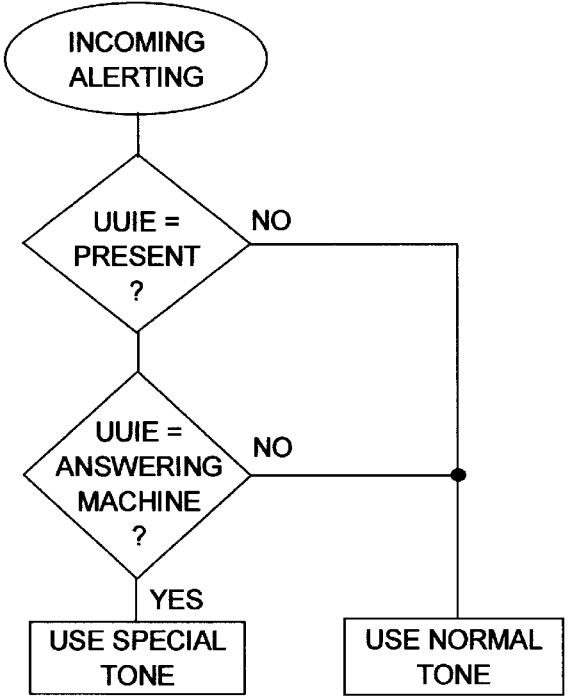
Figure 4:
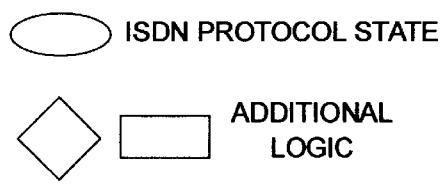

The internal logic required for generating the UUIE will be described, together with the steps performed by said logic, according to the left half of FIG. 4. This logic has to be included in the answering machine (ANSWERING MACHINE LOGIC). The following steps are performed: First, the ISDN SETUP message is received (INCOMING SETUP) by the answering machine from the ISDN network, according to FIG. 1. Next, a UUIE indicating that only an answering machine will respond has to be generated. For this purpose, extra logic at the answering machine is required. In the left half of FIG. 4, this extra logic is depicted as a box (SET UUIE=ANSWERING MACHINE). Next, the ISDN ALERTING (UUIE) message according to FIG. 1 has to be generated, with the UUIE being included in said message. Said ISDN ALERTING (UUIE) message is retransmitted to the ISDN network (OUTGOING ALERTING).

Figure 2:
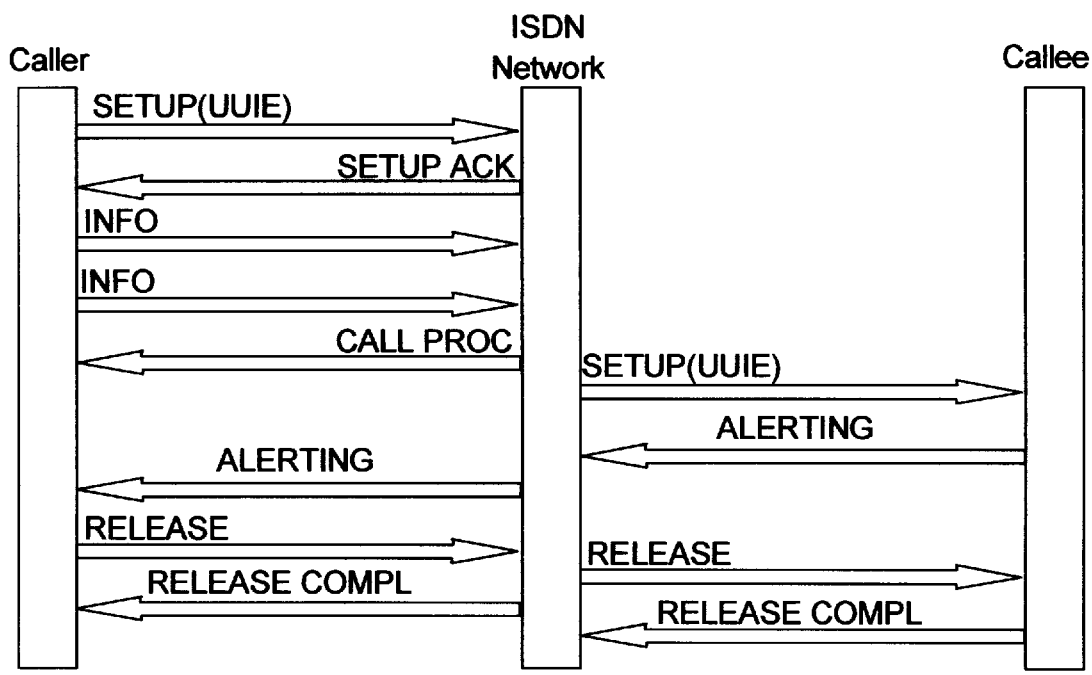
FIG. 2 is a flowchart according to the present invention showing a scenario where a caller intends to talk to a specific person.

In another scenario where a caller cannot reach a desired person since that person not being present, e.g. out of the room, whereby another person is authorized to accept calls at the respective end-device, the according ISDN protocol is shown in FIG. 2. In contrast to the case of FIG. 1, an UUIE is transmitted to the called side (callee) via the setup message. The UUIE contains information about the desired callee. This information can be put in by the caller using a alphanumeric Keyboard (e.g., the callee's name) or special key combinations before setting up the call. With this, different participants can be assigned to the same telephone number and called by using different function keys.

The called device, if capable to process this information, can easily show the callee's name on a display. In addition it could also ring using a prefigured tone. For this, it is mandatory for the calling and called device to use the same semantic of the UUIE information exchanged.

With regard to an implementation of the proposed functionality by utilization of the existing ISDN transmission protocol, various embodiments are possible. By use of an end-device selection number, the so-called "Endgerate-Auswahlziffer" (EAZ), different end-devices can be operated at the same (telephone) line. Thereupon, an end-device can be assigned to multiple EAZ numbers which are used by the end-device for selection of a particular dial tone or a displayed information. It is noteworthy that in the new European (Euro-)ISDN Standard DSS 1 of the European Telecommunication Standards Institute (ETSI), the EAZ is not provided any longer. Instead of EAZ, a so-called "Multiple Subscriber Number" (MSN) can be used for the same purpose.

In an analogous manner, the ISDN subaddress enables the selection of different participants using the same end-device.

Alternatively, to the approach described above using UUIE the subaddress can be used to address different participants and initiate the same logic, e.g. using different bell tones. Common to both approaches is to have the same understanding on both sides about the UUIE or subaddress infonnation respectively.

Figure 3:
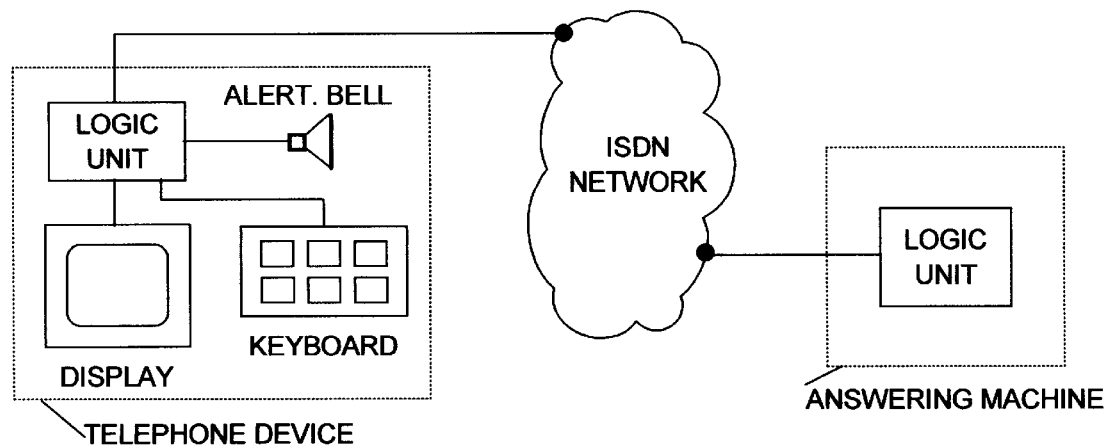
FIG. 3 depicts the main components of a preferred embodiment of the invention implemented as a smart telephone device connected to an answering machine via a switching network.

FIG. 3 depicts a preferred embodiment of the invention where the proposed ISDN functionality for the calling side is implemented into a smart telephone device. That embodiment is now described in a situation where at the called side an answering machine is active. The telephone device comprises a control unit to interpret incoming USER-to-USER information (UUI) and to control the hardware components of the telephone device accordingly. The UUI can cause a common loudspeaker of the telephone set to deliver an acoustic message that at the calling side an answering machine is currently active. Alternatively, on a common display of the telephone set, a respective written message can be displayed.

In case of a scenario where a definite subscriber is desired, the respective information of that person can be input into the control unit via an alphanumerical keyboard of the telephone device. The respective control unit of the telephone device on the called side, in a preferred embodiment, controls a common display where the name of the desired subscriber is viewed. Thus, in case of the desired person currently not being present, other persons which are also authorized to take calls from that device, are invited not to accept the call.

An exemplary embodiment of the smart telephone device's control unit at the calling side, and the steps performed by said control unit, are described with reference to the right half of FIG. 4 (SMART TELEPHONE DEVICE LOGIC). The following steps are performed: First, the ISDN ALERTING (UUIE) message is received (INCOMING ALERTING), from the ISDN network, by the smart telephone device. This corresponds to the caller's side at the left of FIG.

In the smart telephone device, additional logic for analyzing an UUIE which might be contained in said ISDN ALERTING (UUIE) message has to be provided. Said additional logic first checks whether an UUIE is present or not (UUIE=PRESENT ?). In case there is no UUIE present, the tone the caller hears is the normal tone. In the right half of FIG. 4, the circuit that produces said normal tone is depicted as a box (USE NORMAL TONE).

In case there is an UUIE present, another logic has to check whether said UUIE indicates an answering machine at the number being called (UUIE=ANSWERING MACHINE ?). In case there is no answering machine, the tone the caller hears is the normal tone, which is generated by the corresponding circuit (USE NORMAL TONE). In case there is an answering machine at the other end, the tone changes: A special tone is generated by activating the USE SPECIAL TONE circuit of the right half of FIG. 4. This concludes the description of the present invention.

While the invention has been particularly shown and described with reference to preferred embodiments thereof, it will be understood by those skilled in the art that various changes in form and details may be made therein without departing from the spirit and scope of the invention.

We claim:

1. A method for controlling a telecommunication connection between at least one participant on a calling side and at least one participant on a called side in a digital switching network which provides user-to-user protocol, the method including the steps of:

using said user-to-user protocol for the transmission of information about the called participant between the calling side and the called side;

exchanging the information before setting up an operable connection between said calling side and said called side; and using the information to not establish the operable connection between the called side and the calling side before a mechanical device is activated at the called side if said one participant is not available at the called side.

2. Method according to claim 1, where the using step includes:

transmitting a link request from the calling side to the called side;

re-transmitting a message from the called side to the calling side which contains said participant information; and notifying the calling participant of said information at the calling side.

3. Method according to claim 2, wherein said message contains information whether an active participant of the called side is human or non-human.

4. Method according to claim 1, wherein said called participant information includes information about a human participant.

5. Method according to claim 1, further including the steps of providing at least one telephone connection at the calling side;

delivering an alerting message including participant information by the called side to a switching center before acceptance of a connection to said switching center; and delivering a user—user information element which includes said participant information by said switching center to the calling side.

6. Method according to claim 5 further including presenting on the calling side said participant information before setting up a connection.

7. Method according to claim 5 further including presenting on the called side said participant information before setting up a connection.

8. System for controlling a telecommunication connection between at least two end systems of a calling side and a called side in a digital switching network, said network providing user-to-user information, the device including:

input means for customizing said user-to-user information;

logic circuit that exchanges the user-to-user information between said end stations before setting up an operable connection;

means for logically interpreting said user-to-user information;

device that uses the information to not establish an operable connection between the two end systems before an answering device is activated if a specific person is not available at the called side; and control means for controlling use of said user-to-user information.

9. The system according to claim 8, where said means for logically interpreting said user-to-user information comprises display means for viewing said user-to-user information on the respective end system.

10. The system according to claim 8, where said means for logically interpreting said user-to-user information further comprises acoustic means for announcing said user-to-user information on the respective end system.

11. The system according to claim 8, which comprises an alphanumeric keyboard as said input means.

12. A system for controlling a telecommunication connection between at least two end systems at a calling side and a called side, said system including:
- a digital switching network interconnecting the calling side and the called side, said digital switching network including a protocol that transports user-to-user information;
- logic circuit in at least said called side for generating and transmitting via said user-to-user protocol information wherein the information includes participant information and is being transferred before setting up the operable connection;
- logic circuit that uses the participants information to inhibit setting up an operable connection between calling side and called side, before a mechanical device is activated if a participant at the called side is not available;
- means in at least said calling side for customizing said user-to-user information;
- means for logically interpreting said user-to-user information; and
- control means for controlling use of said user-to-user information.

13. The system of claim 12 further input means for customizing said user-to-user information.

14. A device including:
- circuitry that uses user-to-user protocol indigenous to a communications network to transmit information about a called device or person when queried by a remote calling device;
- circuitry that forwards the information before setting up operable connections with said remote calling device; and
- circuitry responsive to the information and operable to inhibit setting up the operable connections before an answering device is activated if the information about the called device or person indicates that said called device or person is not available.

* * * * *